July 14, 1942. K. C. BROWN ET AL 2,290,091
HEAT CONTROL SYSTEM
Filed Dec. 16, 1938
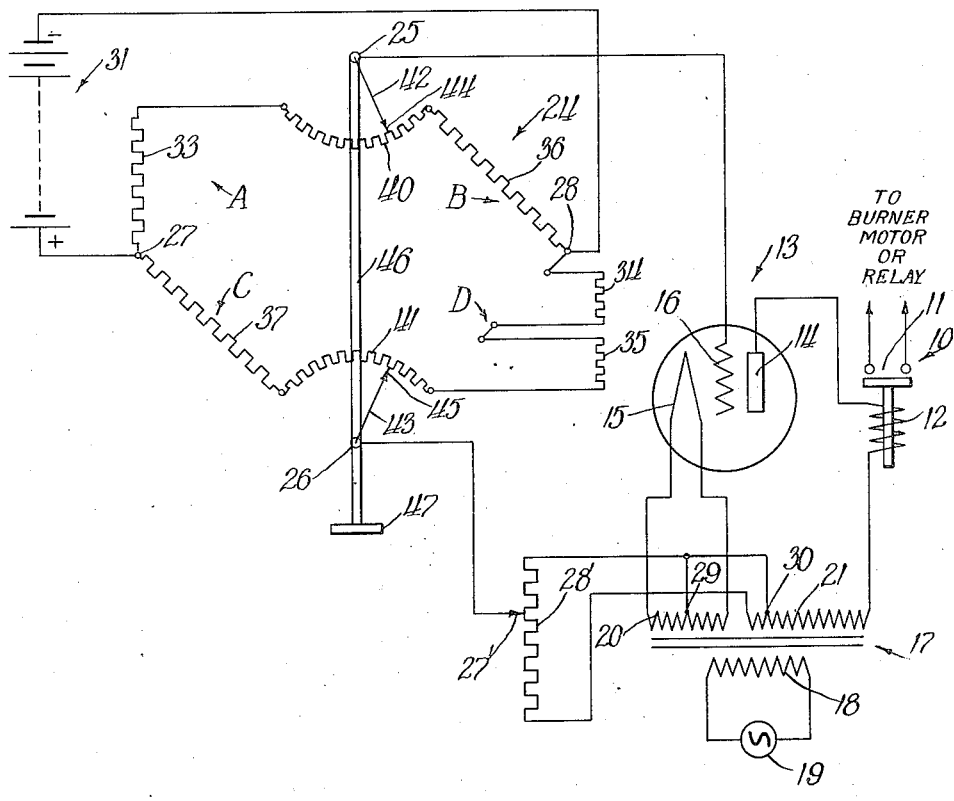
Inventors:
Kenneth C. Brown
Fredric J. Weyher
By Brown, Jackson, Boettcher & Dienner
Attys.

Patented July 14, 1942

2,290,091

UNITED STATES PATENT OFFICE 2,290,091

HEAT CONTROL SYSTEM

Kenneth C. Brown, Evanston, and Fredric J. Weyher, Chicago, Ill.; said Weyher assignor to said Brown Application December 16, 1938, Serial No. 246,014

4 Claims. (Cl. 236—78)

Our invention relates generally to electric control systems, and it has particular relation to heat control systems.

It is desirable to manufacture apparatus for controlling heating systems in which certain temperature responsive devices are connected in standard form rather than to make each apparatus unit of special design and construction for different installations. The reasons for this standard construction are obvious. It reduces the cost of manufacturing the equipment since special apparatus is eliminated and mass production methods can be employed. Since only standard parts are used, they can be perfected to a higher degree than is ordinarily the case with special apparatus. Repairs are facilitated since the parts are generally interchangeable.

It is seldom, if ever, that two applications of heat control apparatus are identical. This is due to the fact that there are many different types of heating equipments and plants, different kinds and types of fuels are employed, the arrangements of the heating load is widely variable, the space to be heated may be either well or poorly insulated, and, of course, the general climatic conditions widely vary. Thus, while it is desirable to manufacture and sell a standard unit for controlling a heating system, it is also desirable to provide some means for readily adapting such equipment for use in widely varying installations where different operating conditions must be met.

Because of several varying factors, different operating cycles of the heating plant are required, that is, the relation between the time that the apparatus is functioning and the time that it is not functioning will depend largely upon the conditions that are individual to each installation. Of course, these conditions are different in each installation and vary somewhat from time to time due to changes in the weather.

Accordingly, the object of our invention, generally stated, is to provide a standard apparatus unit for controlling heating plants which shall be simple and efficient in operation, readily adjustable for different operating conditions and which may be readily and economically manufactured and installed.

An object of our invention is to provide for simultaneously adjusting different parts of a heat control apparatus in order to adapt a standard form of the same to widely varying operating conditions.

Another object of our invention is to provide for simultaneously adjusting the opposite arms of a bridge circuit in which are connected one or more temperature responsive devices in order to adapt the bridge circuit and the temperature responsive devices for use in controlling the functioning of heating plants operating under widely varying conditions.

A further object of our invention is to provide for varying the temperature limits between which control apparatus is operable in controlling the functioning of a heating plant.

Other objects of our invention will in part be obvious and in part appear hereinafter.

Accordingly, our invention is disclosed in the embodiment thereof shown in the accompanying drawing, and it comprises the features of construction, combination of elements and arrangement of parts which will be exemplified in the construction hereinafter set forth and the scope of the application of which will be set forth in the appended claims.

For a more complete understanding of the nature and scope of our invention reference may be had to the following detailed description taken in connection with the accompanying drawing in which the single figure illustrates diagrammatically a concrete embodiment of our invention.

Referring now to the drawing, it will be observed that the reference character 10 designates generally a control relay having contact members 11 which are arranged to open and close a control circuit to a burner motor or relay of a heating plant. For example, the contact members 11 may be arranged to control the functioning of an oil fired heating plant or they may be arranged to control the functioning of a stoker for a coal fired heating plant. For example, the control apparatus described herein may be employed in conjunction with the system shown in our Patent No. 2,265,512, Dec. 9, 1941.

The control relay 10 is provided with an operating winding 12, the energization of which is controlled by means of an electric valve shown generally at 13. The valve 13 is of the gas filled type and is provided with an anode 14, a cathode 15 and a control electrode 16.

The necessary energizing potential for the winding 12 may be obtained from a transformer, shown generally at 17, having a primary winding 18 connected to a suitable source 19 of alternating current and secondary windings 20 and 21. It will be noted that the secondary winding 20 is connected across the cathode 15 while the secondary winding 21 is connected through the operating winding 12 to anode 14.

With a view to controlling the potential applied to the control electrode 16 in order to vary the conductivity of the valve 13, a control circuit, shown generally at 24, is provided. The control circuit 24 includes a bridge circuit comprising arms A, B, C and D. Terminals 25 and 26 are provided between arms A—B and C—D while terminals 27 and 28 are provided between arms A—C and B—D. The terminal 25 is connected to the control electrode 16 while the terminal 26 is connected to a slider 27' mounted for movement along a resistor 28' which is connected between a mid tap 29 of the secondary winding 20 and a tap 30 of the secondary winding 21. The functioning of the adjustable connection through the resistor 28' will be set forth hereinafter.

In order to energize the bridge circuit for applying a control potential to the control electrode 16, the terminals 27 and 28 are connected across a suitable source of direct current. It will be understood that any suitable source may be employed. For illustrative purposes a battery 31 may be employed.

The control potential that is applied to the control electrode 16 varies in accordance with one or more temperature variables. In order to introduce these variables into the functioning of the bridge circuit temperature responsive resistors are connected into the arms thereof. For example, a resistor 33 is connected in the arm A and is positioned so as to be responsive to the temperature out of doors. Resistors 34 and 35 are provided in the arm D. The resistor 34 may be so positioned that its resistance varies in accordance with the temperature of the heating medium, such as water from a boiler. The resistor 35 may be so located as to be responsive to the temperature in the space to be heated.

In arms B and C resistors 36 and 37 are provided which preferably have an extremely small temperature coefficient of resistance.

For a given set of operating conditions it is of course possible to so arrange the resistors in the arms A, B, C and D as described that the heating plant will be properly controlled. However, as indicated, it is desirable to employ standard units for making up this circuit, and to adapt this standard arrangement for use under any of the operating conditions that are likely to be encountered. The adjustments necessary comprise changing the ratios between the arms A, B, C and D. For a given set of resistance values in these arms the changes in opposite legs should be identical. Otherwise, the factory calibration may be upset.

Therefore, in order to render the control circuit 24 in which standard parts are employed for making up the same applicable for a wide range of operating conditions, resistors 40 and 41 are provided between the arms A—B and the terminal 25 and between the arms C—D and the terminal 26, respectively. Connections from the terminals 25 and 26 to the resistors 40 and 41 are provided by movable arms 42 and 43 carrying sliders 44 and 45 which are adapted to move along the resistors 40 and 41 as shown. The arms 42 and 43 are commonly mounted on an operating rod 46 that is provided with a handle 47. By turning the handle 47 both of the arms 42 and 43 are simultaneously moved relative to their respective resistors 40 and 41. As a result, the same relative change takes place between the arms A and B as takes place between the arms C and D.

As previously indicated, it is also desirable to change the temperature limits between which the control apparatus functions so that the time during which the control means, such as the burner motor, is operating compared to the time that it is not operating can be varied. It is for this purpose that the resistor 28' is provided along which the slider 27' can be moved. By adjusting the slider 27' along the resistor 28' more or less alternating biasing potential is applied to the control electrode 16. By changing this alternating biasing potential it is possible to vary the periods during which the electric valve 13 is rendered conducting for certain given values of resistance of the resistors 33, 34 and 35.

Since certain further changes may be made in the foregoing circuit arrangements and different embodiments of the invention may be made without departing from the scope thereof, it is intended that all matter shown in the accompanying drawing or described hereinbefore shall be interpreted as illustrative and not in a limiting sense.

We claim as our invention:

1. Apparatus for controlling a heating system comprising, in combination, control means for the heating system; electric valve means including an anode, a cathode and a control electrode operatively connected to said control means; a bridge circuit having two pairs of terminals with one terminal of one pair being connected to said control electrode and the other terminal being connected to said cathode, circuit means connecting the other pair of terminals to a direct current source, means responsive to variations in temperature connected into said bridge circuit for varying the potential applied to said control electrode from said direct current source to in turn effect operation of said control means, a variable resistor interposed between each terminal of said one pair of terminals, and means common to both variable resistors for simultaneously adjusting them to adapt said bridge circuit and said temperature responsive means for different operating conditions.

2. Apparatus for controlling a heating system comprising, in combination, control means for the heating system; electric valve means including an anode, a cathode and a control electrode operatively connected to said control means; a control circuit for said control electrode including a bridge circuit having two pairs of terminals with one terminal of one pair being connected to said control electrode and the other terminal being connected to said cathode, circuit means connecting the other pair of terminals to a direct current source, means responsive to variations in temperature connected into said bridge circuit for varying the potential applied to said control electrode from said direct current source to in turn effect operation of said control means, a variable resistor interposed between each terminal of said one pair of terminals, means for introducing a potential into said control circuit, and means for varying said potential introduced into said control circuit for varying the temperature limits between which said bridge circuit and said temperature responsive means are adapted to effect operation of said control means.

3. Apparatus for controlling a heating system comprising, in combination, control means for the heating system; electric valve means including an anode, a cathode and a control electrode operatively connected to said control means; a control circuit for said control electrode including a bridge circuit having two pairs of terminals with one terminal of one pair being connected to said control electrode and the other terminal being connected to said cathode, circuit means connecting the other pair of terminals to a direct current source, means responsive to variations in temperature connected into said bridge circuit for varying the potential applied to said control electrode from said direct current source to in turn effect operation of said control means, a variable resistor interposed between each terminal of said one pair of terminals, means common to both variable resistors for simultaneously adjusting them to adapt said bridge circuit and said temperature responsive means for different operating conditions, means for introducing a potential into said control circuit, and means for varying said potential introduced into said control circuit for varying the temperature limits between which said bridge circuit and said temperature responsive means are adapted to effect operation of said control means.

4. Apparatus for controlling a heating system comprising, in combination, control means for the heating system; electric valve means including an anode, a cathode and a control electrode operatively connected to said control means; a control circuit for said control electrode including a bridge circuit having two pairs of terminals with one terminal of one pair being connected to said control electrode and the other terminal being connected to said cathode, circuit means connecting the other pair of terminals to a direct current source, means responsive to variations in temperature connected into said bridge circuit for varying the potential applied to said control electrode from said direct current source to in turn effect operation of said control means, means for introducing a potential into said control circuit, and means for varying said potential introduced into said control circuit for varying the temperature limits between which said bridge circuit and said temperature responsive means are adapted to effect operation of said control means.

KENNETH C. BROWN.
FREDRIC J. WEYHER.